(12) United States Patent  
Carlucci

(10) Patent No.: US 9,110,942 B2  
(45) Date of Patent: Aug. 18, 2015

(54) PROGRAMMER INTERFACE FOR MANUFACTURING EXECUTION SYSTEM

(75) Inventor: Claudio Carlucci, Genoa (IT)

(73) Assignee: Siemens Aktiengesellschaft, Munich (DE)

(*) Notice: Subject to any disclaimer, the term of this patent is extended or adjusted under 35 U.S.C. 154(b) by 1965 days.

(21) Appl. No.: 12/154,018

(22) Filed: May 20, 2008

(65) Prior Publication Data

US 2009/0006339 A1 Jan. 1, 2009

(30) Foreign Application Priority Data

Jun. 29, 2007 (EP) .................................... 07012690

(51) Int. Cl.
*G06F 17/00* (2006.01)
*G06F 17/30* (2006.01)

(52) U.S. Cl.
CPC ................................ *G06F 17/30395* (2013.01)

(58) Field of Classification Search
USPC ......... 707/706, 713, 736, 758, 791, 802, 828, 707/954, 956, 960
See application file for complete search history.

(56) References Cited

U.S. PATENT DOCUMENTS

| 5,847,957 A * | 12/1998 | Cohen et al. ................... 700/108 |
| 6,839,713 B1* | 1/2005 | Shi et al. ................................ 1/1 |
| 2001/0037345 A1* | 11/2001 | Kiernan et al. ............... 707/513 |

OTHER PUBLICATIONS

Henrard et al.; "Data Structure Extraction in Database Reverse Engineering"; Lecture Notes in Computer Science vol. 1727, Springer Verlag; Nov. 15, 1999-Nov. 18, 1999; pp. 149-160; ISBN: 3-540-66653-2.
Jianguo; "Reengineering of Database Applications to EJB Based Architecture"; Lecture Notes in Computer Science, Springer Verlag, Berlin, Germany; May 27, 2002-May 31, 2002; pp. 149-160, ISSN: 0302-9743.

* cited by examiner

*Primary Examiner* — Rehana Perveen
*Assistant Examiner* — Tiffany Thuy Bui
(74) *Attorney, Agent, or Firm* — Laurence A. Greenberg; Werner H. Stemer; Ralph E. Locher

(57) ABSTRACT

In order to accelerate the analysis of the structure of a data source of the manufacturing execution system a programmer interface for analyzing a data source of a manufacturing execution system includes a query browser having query building means for generating a query, an execute means configured to provide provides means for receiving data from the data source according to the query, and a data structure means configured to provide a structure of the received data based on the query.

5 Claims, 2 Drawing Sheets

PROGRAMMER INTERFACE FOR MANUFACTURING EXECUTION SYSTEM

BACKGROUND OF THE INVENTION

The present invention relates to the technical field of manufacturing execution systems.

Manufacturing execution systems (MES) usually have to access different data sources. Examples of data sources are data bases and real time data sources. Examples of data bases are a material manager data base, a production order manager data base and a performance analyzer data base. Examples of real time data sources are real time data bases and sensors, for example a temperature sensor, a pressure sensor and a smoke sensor. Usually, the data sources are already given in a production plant, when developing a new component of a manufacturing execution system for accessing the data source. It usually requires a considerable effort to analyze the data source, in order to depict it's structure. Even more so, since data sources in real production plants can be of almost any kind, for example they can be implemented as relational data bases, hierarchical data bases, or real time data source s such as sensors. The term structure in this document comprises, for example, the format of data (e.g., file format) and/or the type of data (e.g., string, number, Boolean, vector, data base, ...) and/or relations between data objects of the data source and/or architecture of the data source comprised within the data source.

SUMMARY OF THE INVENTION

There is, therefore, a need for a programmer interface and a manufacturing execution system for accelerating the analysis of the structure of a data source of the manufacturing execution system. Accordingly, one aspect involves a programmer interface having a query browser, a data structure means and an execute means. The query browser has query building means for generating a query. The execute means provides means for receiving data from the data source according to the query. The query structure means provides a structure of the received data based on the query.

The structure of the received data can then be accessed by the programmer, for example, by means of a graphical user interface, a .NET data set base, or an automatically generated .NET class.

The execute means can comprise a runtime environment and/or a logic for executing a simulation of the received data.

As an example, the query building means are able to receive a query from a graphical user interface. The query can for example be typed into the graphical user interface in a text box or selected from a list of possible queries.

According to a preferred embodiment, the query browser comprises means for processing the received data according to the structure. The processing of the received data preferably includes the displaying of the structure of the received data. This results in the advantage that during graphical user interface engineering a data structure preview allows to add visual customization and constraint. Visual customization can, for example, be a progress bar that represents a percentage. A possible example of a constraint is the knowledge of the name of the columns of a material manager grid during engineering, while within a runtime environment, the whole grid is filled. With this exemplary information a user can decide to leave a column invisible which is not of interest to him. Without the information about structure of the data it would not be possible to identify this column.

According to another preferred embodiment, the query building means are adapted to generate a query for a relational data base, whereas the mean s for receiving data from the data source are adapted to receive data from the relational data base, and the query structure means are adapted to provide a structure corresponding to the relational data base. This way data sources that include a relational data base can be analyzed. MES data sources that include relational data bases are for example a material manager, a personnel manager, a plant performance analyzer, or a production order manager.

According to another preferred embodiment, the query building means are adapted to generate a query for real time data, whereas the means for receiving data from the data source are adapted to receive the real time data, and the query structure means are adapted to provide the structure corresponding to the real time data. This way data sources that include real time data can be analyzed. MES data sources that include real time data are for example a sensor or a real time data base. In a more specific preferred embodiment, the providing of the structure of the data includes the information that the data are real time data.

According to another preferred embodiment, the query building means are adapted to generate a query for hierarchically structured data, whereas the means for receiving data from the data source are adapted to receive data from the hierarchical data, and the query structure means are adapted for providing a structure corresponding to the hierarchical data. This way data sources that include hierarchical data can be analyzed. MES data sources that include a hierarchical data base are for example a plant equipment tree that is often stored or manipulated by means of a business process model component.

According to another preferred embodiment, the query building means are adapted to generate a query for a heterogeneous data source. The means for receiving data from the data source are adapted to receive data from the heterogeneous data source and the query structure means are adapted for providing a structure corresponding to the heterogeneous data source. This way heterogeneous data sources can be analyzed.

In a more specified preferred embodiment, a programmer interface comprises plurality of sub-interfaces. Each sub-interface is adapted for analyzing a specific kind of sub data source comprised by the data source. As an example, one sub interface is foreseen to analyze relational data bases, another sub interface is foreseen to analyze hierarchical data bases and yet another sub interface is foreseen to analyze a real time data source. In another preferred embodiment the granularity of sub interfaces is chosen according to the different modules of the MES. As an example one sub interface is foreseen to identify and/or to analyze the kind of a material manager's data base, another sub interface is foreseen to identify and/or to analyze the kind of a production order manager's data base, another sub interface is foreseen to identify and/or analyze a plant performance analyzer's data base and yet another sub interface is foreseen to analyze and/or identify a real time data source.

BRIEF DESCRIPTION OF THE SEVERAL VIEWS OF THE DRAWINGS

The novel features and method steps characteristic of the invention are set out in the claims below. The invention itself, however, as well as other features and advantages thereof, are best understood by reference to the detailed description, which follows, when read in conjunction with the accompanying drawings, wherein:

DETAILED DESCRIPTION OF THE INVENTION

Figure 1:
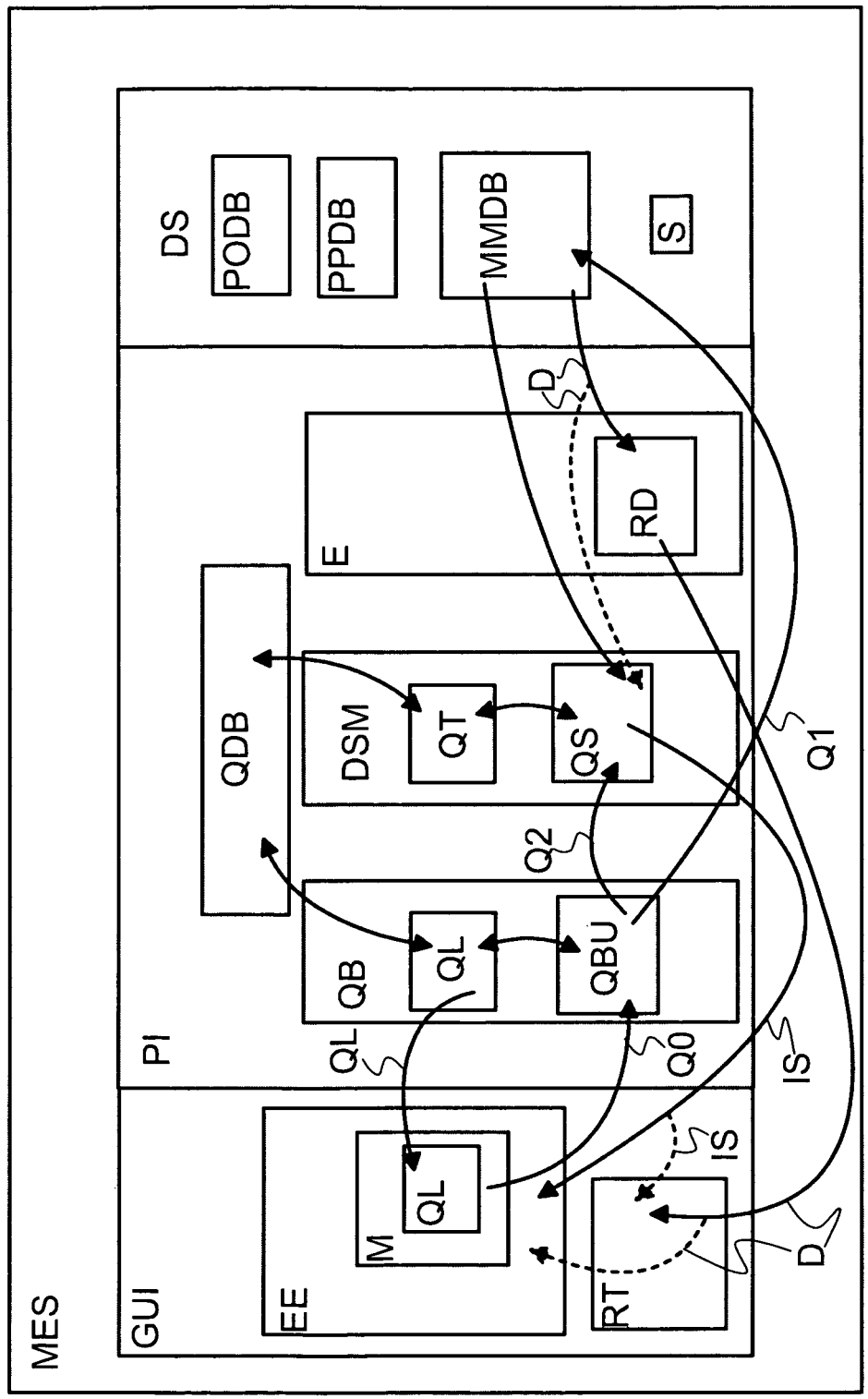
FIG. 1 shows a manufacturing execution system.

FIG. 1 shows a manufacturing execution system MES comprising a data source DS, a graphical user interface GUI, and a programmer interface PI according to a preferred embodiment of the invention. The programmer interface PI comprises a query browser QB, a data structure means DSM, and an execute means E. The data source comprises a material manager data base MMDB, a production order manager data base PODB, a plant performance analyzer data base PPDB and a sensor S. The graphical user interface comprises an engineering environment EE and a runtime environment RT.

The query browser QB comprises a query list QL and query building means QBU for generating a query Q1, Q2. NB: In this embodiment Q1 and Q2 are basically the same query. However, they are referred to by different reference signs since they can be coded in different formats.

The data structure means DSM comprises a query table QT assigning a structure to a query. The data structure means DSM also comprise a query structure means QS, able to provide a structure of received data based on the query Q2.

The execute means E provides means RD for receiving data D from the data source DS according to the query Q2.

The query browser QB is connected to the graphical user interface GUI and provides within the graphical user interface GUI a menu M, which gives a programmer the possibility to select or type in a query Q0. In order to generate a menu M, a query list QL providing the menu items of the menu M can be stored within the query browser QB and handed over to the graphical user interface GUI. Alternatively or in addition to the menu M the query browser QB can also provide a text box or window in order to give the programmer the possibility to type in the query Q0.

Once generated, the query Q0 is forwarded to the query building means QBU where the query Q0 is transformed into a query Q1 with a format that is compatible with the data source DS and into a query Q2 that is compatible with the data structure means DSM. In case the query format of Q0 is compatible with the data source DS and/or with the data structure means DSM, the transformation of the query Q0 into Q1 and/or Q2 is not necessary. In this case query Q1 is equal to query Q0 and/or query Q2 is equal to Q0.

Alternatively to providing a text box, window or menu within the graphical user interface GUI, the query browser QB can also provide its own graphical user interface in order to take up the input from the programmer.

The query Q1 is forwarded from the query building means QBU to the data source DS, and initiates the allocation of data that is to be sent to the query execute means E. Therefore, means RD for receiving the data are comprised by the execute means E. The execute means E.

The query Q2 is forwarded from the query building means QBU to the query structure means QS. According to the query Q2, the query structure means QS provides information IS about the structure of the data. Optionally, the providing of the information IS can be supported by transmitting the data D to the query structure means QS, where the structure of the data D is additionally analyzed. Information IS about the structure of the data D is then forwarded to the engineering environment EE in order to display the structure of the data D to the programmer. According to a preferred embodiment the information IS is additionally transmitted to the runtime environment for example for testing if the information IS about the structure of the data is correct.

In addition the data D can also be forwarded to the runtime environment RT and/or to the engineering environment EE. In the engineering environment this gives the option to display both to the programmer, the content of the data and the structure of the data. Additionally a programmer can check, if the structure was evaluated correctly.

According to another preferred embodiment the data structure means DSM also comprise a query table QT, where the structure can be looked up. The programmer interface PI preferably also comprises a query data base QDB from which the query list QL and the query table QT receive and synchronize query data, e.g., a list of all possible queries and data structures supported by the manufacturing execution system MES.

Figure 2:
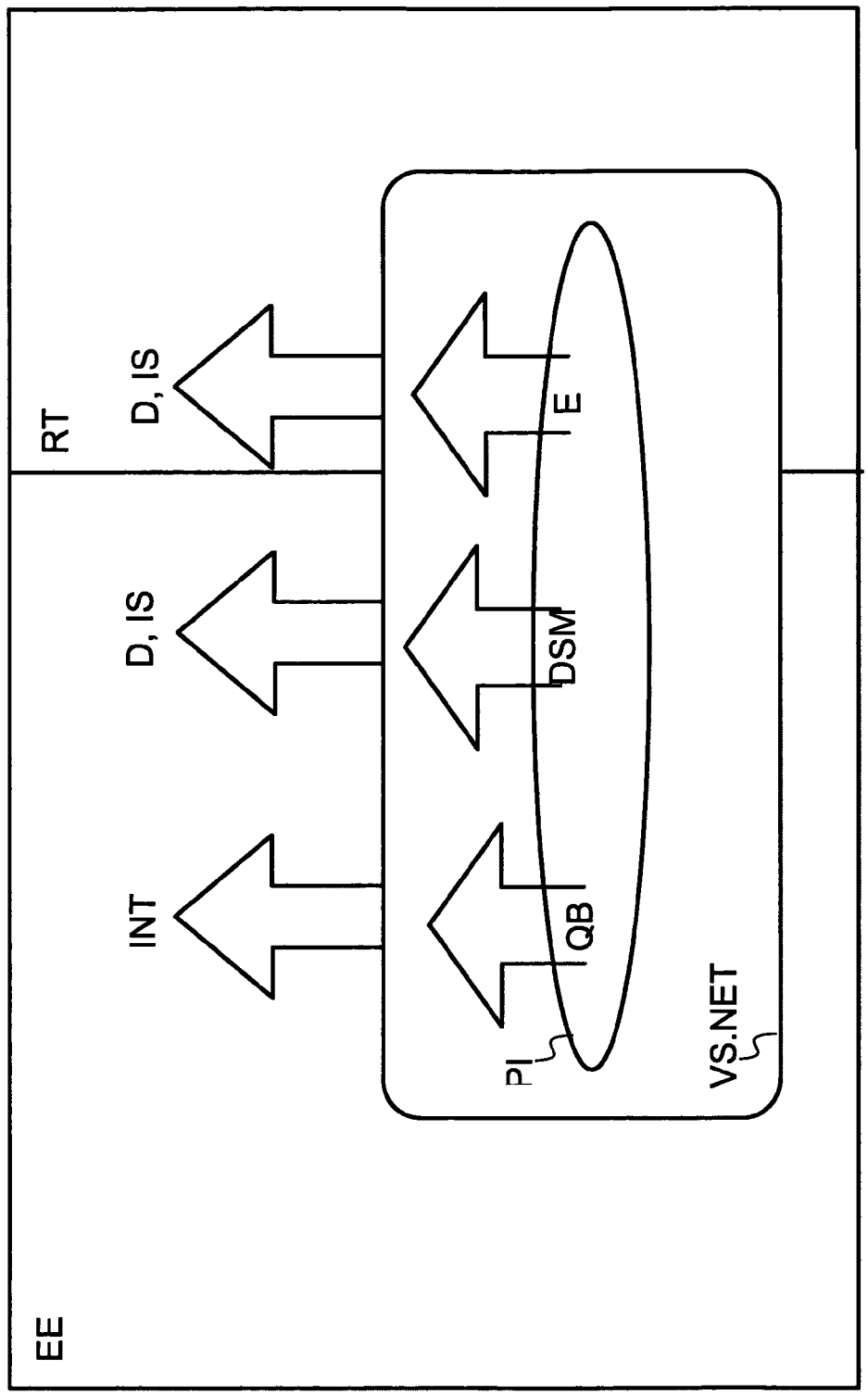
FIG. 2 shows a typical use case of the invention for a NET data provider.

FIG. 2 shows a typical use case of the invention for a .NET data provider. A programmer interface is thereby integrated into a VS.NET framework. The programmer interface PI comprises a query browser QB, a data structure means DSM and an execute means E. The query browser QB and the data structure means DSM are comprised by an engineering environment EE for cabinet files. The execute means, are comprised by an runtime environment for cabinet files. The query browser QB is used for the VS.NET integration INT for the query management. The data structure means provides the data D and the information IS about the structure of the data D for a Win and Web form.

The following steps are performed:

1) Drop the DataProvider to the Win/Web Form
2) Select, from VS.NET Property Grid or context menu, the query.
3) Generate a "typed Dataset" to provide "query" data description in a "bindable" form.

At Run-Time:

4) Perform the query execution and DataSet "fill"

In other words: The invention also serves to create a programmer interface, for example, for accessing all manufacturing execution system's data access, such as cabinet data files (CAB). The interface can be used by a CAB team in order to implement different integration strategies, for example integration of ASP.NET, Microsoft® CAB and custom CAB. Putting in focus the software that underlies the hardware of the invention, in another preferred embodiment, the programmer interface can be defined as follows with three methods of an object oriented programming language. The three methods are called QueryBrowser-method, QueryExecute-method and QueryStruct-method and are defined as follows:

QueryBrowser-method: The QueryBrowser-method generates a "graphical user interface" allowing the selection or composition of any specific query and comprises the following parameters:

[in] Previous_query: a previous query in order to allow "query" modification

[out] Parameter_list: the list of possible new query parameters

Return Value:

[out] the new query

QueryExecute-method: The QueryExecute-method provides during run-time data retrieval and comprises the following parameters:

Bool QueryExecute([in] string query, [in] object[ ] parameters_value_list, [out] object[ ] values)

Parameters:

[in] query: the query obtained from a QueryBrowser call during engineering

[in] parameters_value_list: a list of values to be used as parameter for the query

[out] values: the data retrieved using the current query and parameters value.

Return Value:

[out] end result (success or fail)

QueryStruct-method: The QueryStruct-method provides during engineering and runtime a description of the datas tructure that QueryExecute will give for the current query and comprises the following parameters:

Bool QueryStruct([in] string query, [out] string XML-DataStructDescr)

Parameters:

[in] query: the query obtained from a QueryBrowser call during engineering

[out] XMLDataStructDescr: a description of the CO classes/datastructure for the current query Return Value:

[out] end result (success or fail)

The introduction of the programmer interface splits data integration of a new module for accessing a data source of a manufacturing execution system in two different sub-tasks:

CAB data management development which is delegated to each team that develops a module. The team does not require any specific knowledge about the specific architecture of the data source.

Component development (for example CAB ASP.NET Component) delegated to CAB team with specific know-how about ASP.NET, Internet Explorer and Visual Studio .NET architecture and integration technique.

Further advantages of the invention include:

1) Bugs: thanks to this two components approach all teams' know-how will be used preventing potential cross teams misunderstanding.
2) Costs: this technique doesn't require any more expensive study phases.
3) Standardization: the QueryBrowser-method can provide a user interface for query selection, modification or creation; today also this task is delegated to CAB team. The result is, at least, to develop two different UI for the same PS data selection (the "official data browser" developed by PS Component standard client and the "unofficial data browser" developed by CAB team). If the Browser UI of a particular PS data is developed by the same PS team, it'll be possible to provide a unique, official and standard data browsing GUIs.

What is claimed is:

1. A manufacturing execution system comprising:
a data source;
a computer having a display device and implementing a programmer interface for analyzing the data source;
the programmer interface including a query browser, an execute means, and a data structure means;
the query browser including query building means for generating a query;
the execute means configured to provide provides means for receiving data from the data source according to the query; and
the data structure means configured to provide a structure of the received data based on the query;
wherein the query building means are adapted to generate a query for real time data, wherein the means for receiving data from the data source are adapted to receive the real time data, and wherein the data structure means are adapted for providing a structure corresponding to the real time data.

2. The manufacturing execution system of claim 1, wherein the query browser further comprises means for processing the received data according to the structure.

3. The manufacturing execution system of claim 1, wherein the query building means are adapted to generate a query for relational data, wherein the means for receiving data from the data source are adapted to receive the relational data, and wherein the data structure means are adapted for providing a structure corresponding to the relational data.

4. The manufacturing execution system of claim 1, wherein the query building means are adapted to generate a query for hierarchical data, wherein the means for receiving data from the data source are adapted to receive hierarchical data, and wherein the data structure means are adapted for providing a structure corresponding to the hierarchical data.

5. The manufacturing execution system of claim 1, wherein the data source comprises a data base for a material manager data base for at least one of a production order manager and a performance analyzer.

\* \* \* \* \*